(12) United States Patent
Chen et al.

(10) Patent No.: US 11,755,245 B2
(45) Date of Patent: Sep. 12, 2023

(54) METHOD, DEVICE, AND COMPUTER PROGRAM PRODUCT FOR MANAGING ACCESS WORKLOAD OF STORAGE SYSTEM

(71) Applicant: EMC IP Holding Company LLC, Hopkinton, MA (US)

(72) Inventors: Chi Chen, Chengdu (CN); Huijuan Fan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 17/324,565

(22) Filed: May 19, 2021

(65) Prior Publication Data

US 2022/0197559 A1    Jun. 23, 2022

(30) Foreign Application Priority Data

Dec. 22, 2020   (CN) .......................... 202011532115.7

(51) Int. Cl.
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0689* (2013.01)

(58) Field of Classification Search
CPC .... G06F 3/0659; G06F 3/0604; G06F 3/0653; G06F 3/0689
See application file for complete search history.

(56) References Cited

U.S. PATENT DOCUMENTS

| | | |
|---|---|---|
| 7,984,259 B1 | 7/2011 | English |
| 8,010,738 B1 | 8/2011 | Chilton et al. |
| 8,566,483 B1 | 10/2013 | Chen et al. |
| 9,513,814 B1 | 12/2016 | Can et al. |
| 11,163,451 B1 | 11/2021 | Dalmatov et al. |
| 11,163,454 B1 | 11/2021 | Dalmatov et al. |
| 11,599,463 B2 * | 3/2023 | Kondiles ............. G06F 12/0804 |
| 2021/0303466 A1 * | 9/2021 | Kondiles ............... G06F 16/221 |
| 2022/0342578 A1 * | 10/2022 | Chen ..................... G06F 3/0647 |

OTHER PUBLICATIONS

Zhang, Jiadong, Qiongxin Liu, and Jiayu Chen. "An advanced load balancing strategy for cloud environment." 2016 17th International Conference on Parallel and Distributed Computing, Applications and Technologies (PDCAT). IEEE, 2016. (Year: 2016).*

* cited by examiner

*Primary Examiner* — Nicholas J Simonetti
(74) *Attorney, Agent, or Firm* — BainwoodHuang

(57) ABSTRACT

Techniques manage an access load of a storage system. For storage devices in the storage system, access histories of the storage devices in a previous time period are received respectively. Access loads of the storage devices in a future time period are determined respectively based on the access histories of the storage devices, the future time period being between a current time point and a future time point for performing future load balancing. An access balance degree of the storage system at the future time point is acquired based on the access loads. Load balancing is performed among the storage devices in response to determining that the access balance degree satisfies a first predetermined condition. Accordingly, it is possible to determine an access load of each storage device in a storage system more accurately and ensure that the access loads of the storage devices are in a balanced state.

20 Claims, 9 Drawing Sheets

METHOD, DEVICE, AND COMPUTER PROGRAM PRODUCT FOR MANAGING ACCESS WORKLOAD OF STORAGE SYSTEM

CROSS-REFERENCE TO RELATED APPLICATION

This application claims priority to Chinese Patent Application No. CN202011532115.7, on file at the China National Intellectual Property Administration (CNIPA), having a filing date of Dec. 22, 2020, and having "METHOD, DEVICE, AND COMPUTER PROGRAM PRODUCT FOR MANAGING ACCESS WORKLOAD OF STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for managing an access load of a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on Redundant Array of Independent Disks (RAID) have been developed to improve data reliability. When one or more disks in a storage system fail, data in the failed disks may be reconstructed from data on other normally operating disks.

A Mapped RAID has been developed at present. In this mapped RAID, disk is a logical concept and may include a plurality of extents. A plurality of extents included in a logical disk may be distributed on different physical storage devices in a resource pool. During the operation of the storage system, due to differences in frequencies of data being accessed in various storage devices, access loads of the storage devices will also be different. At this moment, how to manage the storage devices so that the access loads of the storage devices remain balanced has become a technical problem.

SUMMARY OF THE INVENTION

Therefore, it is desirable to develop and implement a technical solution for managing an access load of a storage system in a more effective manner. It is desirable that this technical solution is compatible with existing storage systems, and by modifying various configurations of existing storage systems, the access load balancing of a storage system may be implemented in a more effective manner.

According to a first aspect of the present disclosure, a method for managing an access load of a storage system is provided. In this method, for a plurality of storage devices in the storage system, a plurality of access histories of the plurality of storage devices in a previous time period are received respectively. A plurality of access loads of the plurality of storage devices in a future time period are determined respectively based on the plurality of access histories of the plurality of storage devices, the future time period being between a current time point and a future time point for performing future load balancing. An access balance degree of the storage system at the future time point is acquired based on the plurality of access loads. Load balancing is performed among the plurality of storage devices in response to determining that the access balance degree satisfies a first predetermined condition.

According to a second aspect of the present disclosure, an electronic device is provided, including: at least one processor; and a memory coupled to the at least one processor, wherein the memory has instructions stored therein that, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

In the context of the present disclosure, a storage system may be a RAID-based storage system. The RAID-based storage system may combine a plurality of storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are a plurality of standards for RAID, such as RAID-1, RAID-2, RAID-3, RAID-4, RAID-5, RAID-6, RAID-10, RAID-50, and so on.

Figure 1A:
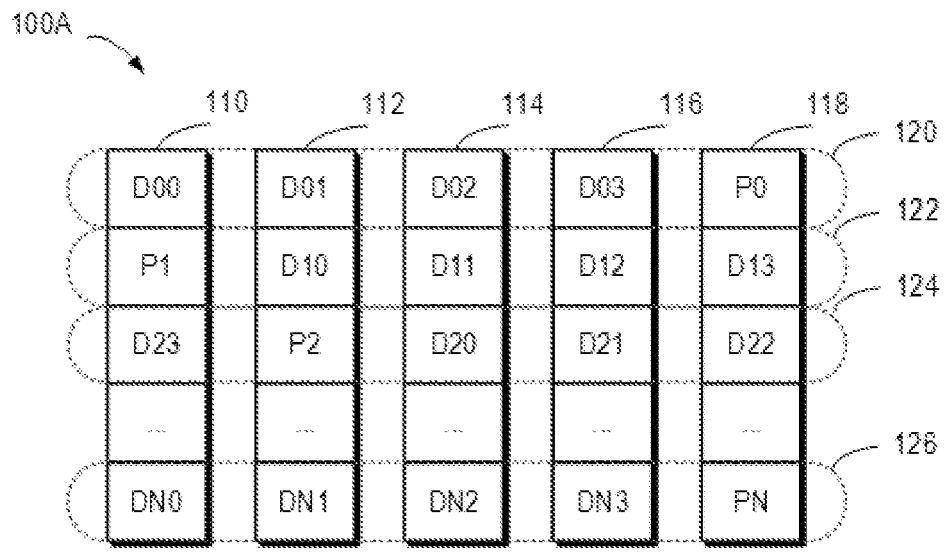
FIGS. 1A and 1B respectively schematically show block diagrams of a storage system in which implementations of the present disclosure may be implemented.

FIG. 1A schematically shows a schematic diagram of storage system 100A in which a method of the present disclosure may be implemented. In the storage system shown in FIG. 1A, a RAID-5 (4D+1P, where 4D represents that a storage system includes four storage devices for storing data, and 1P represents that the storage system includes one storage device for storing a P parity) array including five independent storage devices (110, 112, 114, 116, and 118) is used as an example to illustrate the working principle of RAID. It should be noted that although five storage devices are schematically shown in FIG. 1A, more or fewer storage devices may also be included in other implementations depending on different RAID levels. Although stripes 120, 122, 124, . . . , 126 are shown in FIG. 1A, a RAID system may also include different numbers of stripes in other examples.

In RAID, a stripe may span a plurality of physical storage devices (e.g., stripe 120 spans storage devices 110, 112, 114, 116, and 118). Stripe may be simply understood as a storage area that satisfies a certain address range in the plurality of storage devices. Data stored in stripe 120 include a plurality of parts: data block D00 stored on storage device 110, data block D01 stored on storage device 112, data block D02 stored on storage device 114, data block D03 stored on storage device 116, and data block P0 stored on storage device 118. In this example, data blocks D00, D01, D02, and D03 are stored data, while data block P0 is the P parity of the stored data.

The manner in which data is stored in other stripes 122 and 124 is also similar to that for stripe 120, except that parities related to other data blocks may be stored on a storage device different from storage device 118. In this way, when one of a plurality of storage devices 110, 112, 114, 116, and 118 fails, data in the failed device may be recovered from other normal storage devices.

Figure 1B:
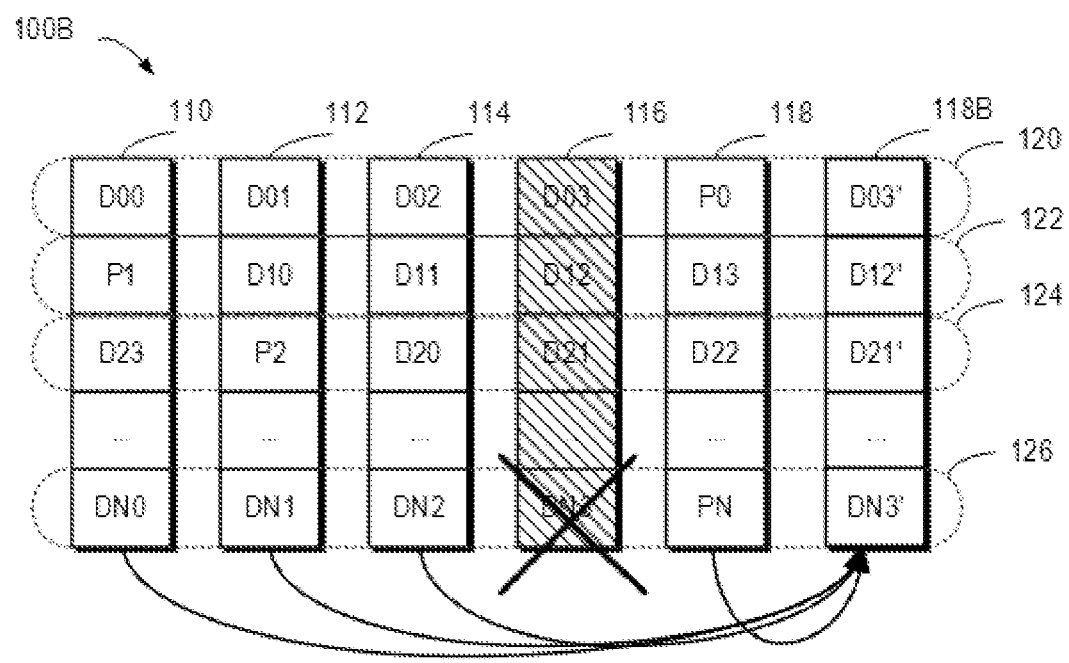

FIG. 1B schematically shows schematic diagram 100B of a reconstruction process of storage system 110A. As shown in FIG. 1B, when one storage device (for example, storage device 116 shown in hatching) fails, data may be recovered from multiple remaining storage devices 110, 112, 114, and 118 that operate normally. At this time, new backup storage device 118B may be added into RAID to replace storage device 118. In this way, the recovered data may be written to 118B and the reconstruction of the system may be realized.

It should be noted that although a RAID-5 storage system including 5 storage devices (wherein 4 storage devices (4D) are used for data storage and 1 storage device (1P) is used for parity storage) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of triple-parity RAID, three storage devices may be used to store parities P, Q, and R respectively.

Figure 2:
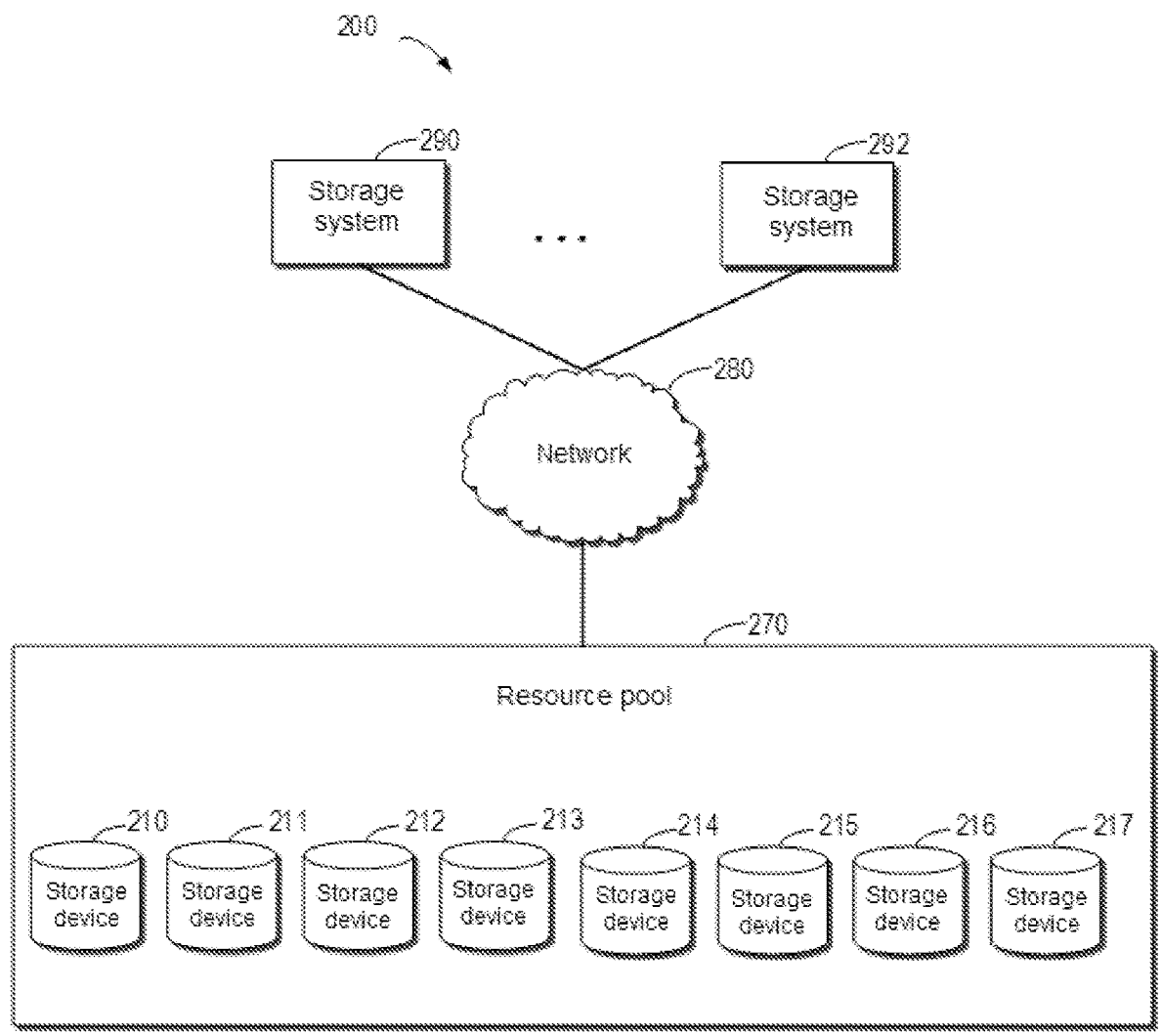
FIG. 2 schematically shows a block diagram of an example environment in which implementations of the present disclosure may be implemented.

With the development of distributed storage technologies, storage devices 110, 112, 114, 116, and 118 in the storage system shown in FIGS. 1A and 1B may no longer be limited to physical storage devices, but may be virtual storage devices. For example, all extents on storage device 110 may respectively come from different physical storage devices (hereinafter simply referred to as storage devices) in a resource pool. FIG. 2 schematically shows a block diagram of an example environment in which a method of the present disclosure may be implemented. As shown in FIG. 2, storage resource pool 270 may include a plurality of physical storage devices 210, 211, 212, 213, 214, 215, 216, and 217. At this moment, storage spaces in the plurality of storage devices may be allocated to storage systems 290, . . . , 292 of a plurality of users. At this moment, storage systems 290, . . . , 292 of users may access the storage spaces in all the storage devices in storage resource pool 270 via network 280. It will be understood that although FIG. 2 only schematically shows the case where storage resource pool 270 includes 8 storage devices, according to an example implementation of the present disclosure, storage resource pool 270 may also include more or fewer storage devices.

Figure 3:
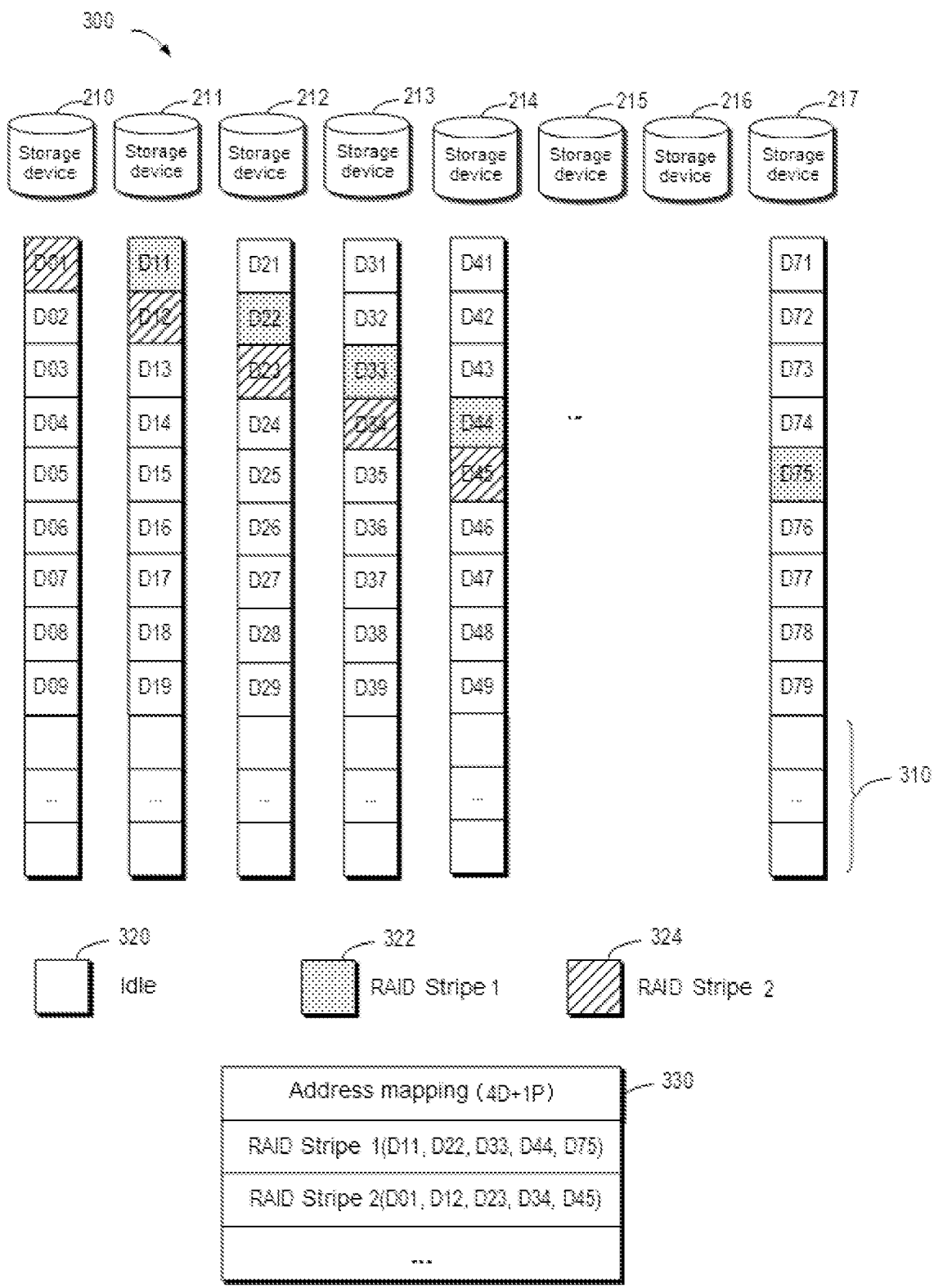
FIG. 3 schematically shows a diagram of a storage resource pool in FIG. 2.

FIG. 3 schematically shows a diagram of more information of storage resource pool 270 shown in FIG. 2. Resource pool 270 may include a plurality of storage devices 210 to 217. Each storage device may include a plurality of extents, where legend 320 represents an idle extent, legend 322 represents an extent for RAID stripe 1, and legend 324 represents an extent for RAID stripe 2. At this moment, extents D11, D22, D33, and D44 for RAID stripe 1 are respectively used to store data blocks of the stripe, and extent D75 is used to store a parity of data. Extents D01, D12, D23, and D34 for RAID stripe 2 are used to store data blocks of the stripe respectively, and extent D45 is used to store a parity of data.

As shown in FIG. 3, address mapping 330 shows an association relationship between stripes and addresses of extents in the stripes. For example, RAID stripe 1 may include 5 extents: D11, D22, D33, D44, and D75, and these 5 extents are located in storage devices 211, 212, 213, 214, and 217, respectively. Specifically, as shown in FIG. 3, extent D11 is the first extent in storage device 211, and extent D22 is the second extent in storage device 212. As shown in FIG. 3, there may also be reserved idle part 310 in each storage device, so that when one storage device in the resource pool fails, extents in idle part 310 in each storage device may be selected to reconstruct all extents in the failed storage device.

It should be noted that FIG. 3 only uses a 4D+1P RAID-5 storage system as an example to show how the extents in the stripes are distributed in the plurality of storage systems in the resource pool. When another RAID level is adopted, those skilled in the art can implement specific details based on the above principles. For example, in a 6D+1P+1Q RAID-6 storage system, 8 extents in each stripe may be distributed on a plurality of storage devices.

It will be understood that, with the operation of the storage system, use loads of the plurality of storage devices will be different, which will cause relatively high access loads of certain storage devices. Access load may have various representations. For example, at least any one of the following may be used to represent the access load: the number of accesses per unit time, the volume of data accesses per unit time, the total number of accesses, the total volume of data accesses, and so on. Excessive access loads will cause the read and write bandwidth of certain storage devices to become a bottleneck restricting the read and write speed. Furthermore, excessive access loads may also cause these storage devices to be excessively worn.

Currently, technical solutions have been proposed to perform load balancing between a plurality of storage devices in a storage system based on monitoring of use loads of the plurality of storage devices. However, the performances of these technical solutions are not satisfactory. In one solution, the load balancing process may be triggered based on current access loads of the plurality of storage devices in the storage system. For example, when a certain storage device is found to have a high access load, data in this storage device may be moved to a storage device having a low access load in the storage system. Typically, there are fluctuations in data access in the storage system, and if the load balancing process is triggered based on a current access load, it may be difficult to perform load balancing operations effectively.

In order to at least partially solve the deficiencies in the technical solutions described above, according to an example implementation of the present disclosure, an access load of each storage device in a future time period (i.e., a time period between a current time point and a future time point for periodically performing future load balancing) is determined based on an access history of the storage device, and it is thereby determined whether to perform a load balancing process. With the example implementation of the present disclosure, a future access load of each storage device may be effectively predicted based on the statistics on historical data, thereby determining, in a more accurate and effective manner, whether to perform a load balancing process. Further, it may be ensured that the access load of each storage device is within an acceptable range in a future time period. In this way, it may be ensured that the access loads of all the storage devices are maintained at a relatively even level throughout the operation period of the storage system.

Figure 4:
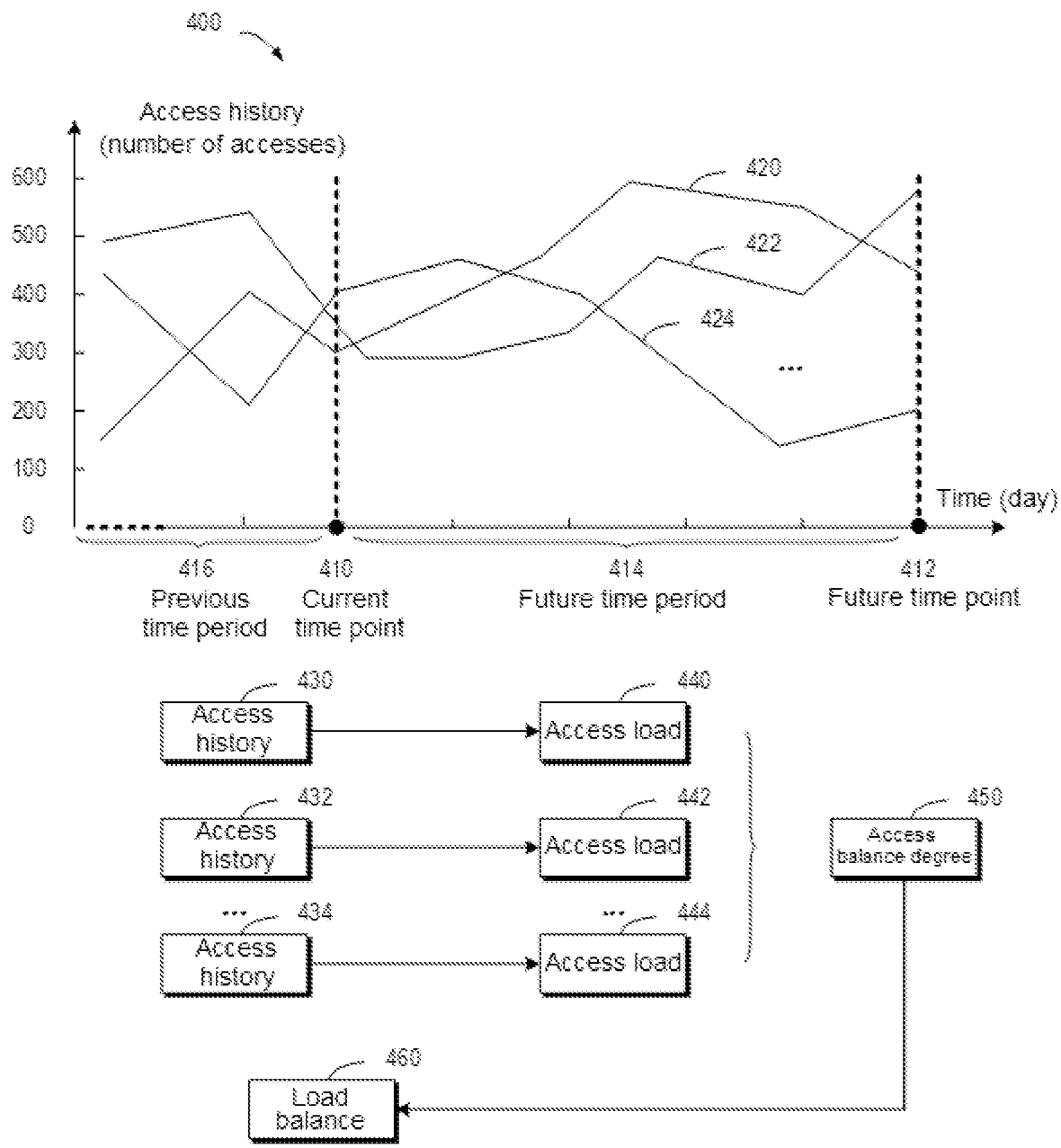
FIG. 4 schematically shows a block diagram of a process for managing an access load of a storage system according to an implementation of the present disclosure.

First, an overview of a method according to an example implementation of the present disclosure will be described with reference to FIG. 4. FIG. 4 schematically shows a block diagram of process 400 for managing an access load of a storage system according to an implementation of the present disclosure. As shown in FIG. 4, the horizontal coordinate represents time (e.g., in a unit of "day," "week," or "month"), and the vertical coordinate represents an access history (e.g., in a unit of the number of accesses) for each storage device.

FIG. 4 shows a technical solution for periodically performing a load balancing process. Reference number 410 represents a current time point when this round of load balancing will be performed, reference number 412 represents a future time point when the next round of future load balancing will be performed, a time period before current time point 410 represents previous time period 416, and a time period between current time point 410 and future time point 412 represents future time period 414.

Assuming that the storage system includes M storage devices, and curves 420, 422, . . . , 424 respectively show access load changes of the storage devices. According to an example implementation of the present disclosure, a plurality of access histories 430, 432, . . . , and 434 (i.e., portions of curves 420, 422, . . . , and 424 in previous time period 416) of the plurality of storage devices in the previous time period may be received respectively. A plurality of access loads 440, 442, . . . , and 444 (predicted values obtained based on the access histories) of the plurality of storage devices in future time period 414 may be determined respectively based on the plurality of access histories of the plurality of storage devices.

Access balance degree 450 of the storage system at future time point 412 may be acquired based on the plurality of access loads 440, 442, . . . , and 444. For example, an average value of the access loads of the plurality of storage devices may be determined, and access balance degree 450 of the storage system may be determined based on the access load of each storage device and the average value. If it is determined that access balance degree 450 satisfies a first predetermined condition, it means that the access loads of the storage devices are not consistent, and therefore, load balancing 460 needs to be performed across the plurality of storage devices in the storage system at current time point 410.

With the example implementation of the present disclosure, whether load balancing needs to be triggered at current time point 410 may be determined based on the access loads of the storage devices in future time period 414. Compared with the existing technical solution of determining whether to trigger a load balancing process based on a current access load, the access load may represent the change of access loads during the whole future time period 414, and the overall state of a plurality of storage devices in future time period 414 may be reflected more accurately. Therefore, it is possible to determine, in a more accurate manner, whether to perform the load balancing process.

Further, after the load balancing process has been triggered and performed, the storage system may be ensured to be in a well access load balanced state for a time period until the next load balancing is performed (i.e., future time period 414). In other words, the access loads of the plurality of storage devices may be maintained in an acceptable range. Even if it is determined at current time point 410 not to perform the load balancing process, since this determination is obtained based on predicted values of the access loads in future time period 414, the plurality of storage devices may still maintain similar access loads in future time period 414.

Figure 5:
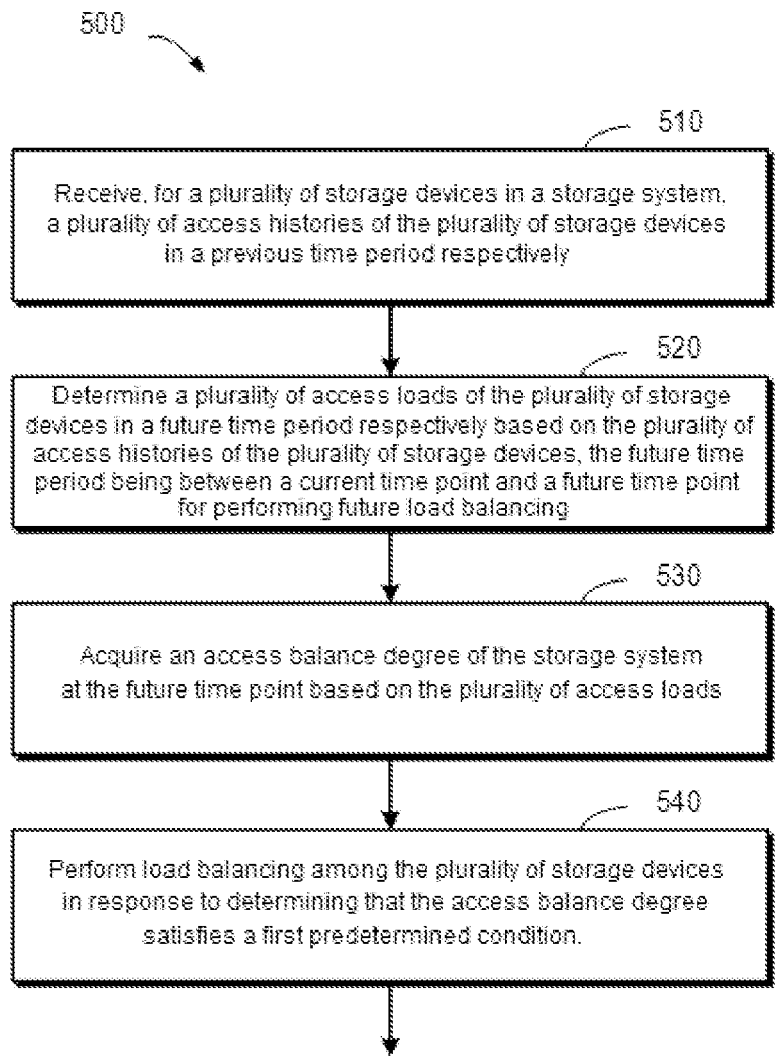
FIG. 5 schematically shows a block diagram of a method for managing an access load of a storage system according to an implementation of the present disclosure.

Hereinafter, more details of the method according to an example implementation of the present disclosure will be described with reference to FIG. 5. FIG. 5 schematically shows a block diagram of method 500 for managing an access load of a storage system according to an implementation of the present disclosure. At block 510, for a plurality of storage devices in the storage system, a plurality of access histories of the plurality of storage devices in a previous time period are received respectively. Here, an access history may be acquired respectively for each of the plurality of storage devices. For the sake of simplicity, only one storage device will be described as an example below.

More details about previous time period 416 will be described by returning to FIG. 4. To more clearly capture the change pattern of the access load, the length of previous time period 416 may be greater than the length of future time period 414. Assuming that each scale in the horizontal coordinate of FIG. 4 represents 1 day and that the next load balancing process is scheduled to be performed at future time point 412 (after 5 days), the length of previous time period 416 may be set to be greater than 5 days at this moment. According to an example implementation of the present disclosure, the length of previous time period 416 may be set to 10 days (or another time length). At this moment, the access history in the past 10 days may be acquired.

It will be understood that although FIG. 4 schematically shows that previous time period 416 is immediately adjacent to current time point 410, according to an example implementation of the present disclosure, there may be a time interval between previous time period 416 and current time point 410. The access history herein may include a plurality of access loads collected respectively at a plurality of time points in previous time period 416. Still referring to FIG. 5, at block 520, a plurality of access loads of the plurality of storage devices in future time period 414 are determined respectively based on the plurality of access histories of the plurality of storage devices. Future time period 414 is between current time point 410 and future time point 412 for performing future load balancing. Specifically, the access load may be determined for each of the plurality of storage devices.

Figure 6:
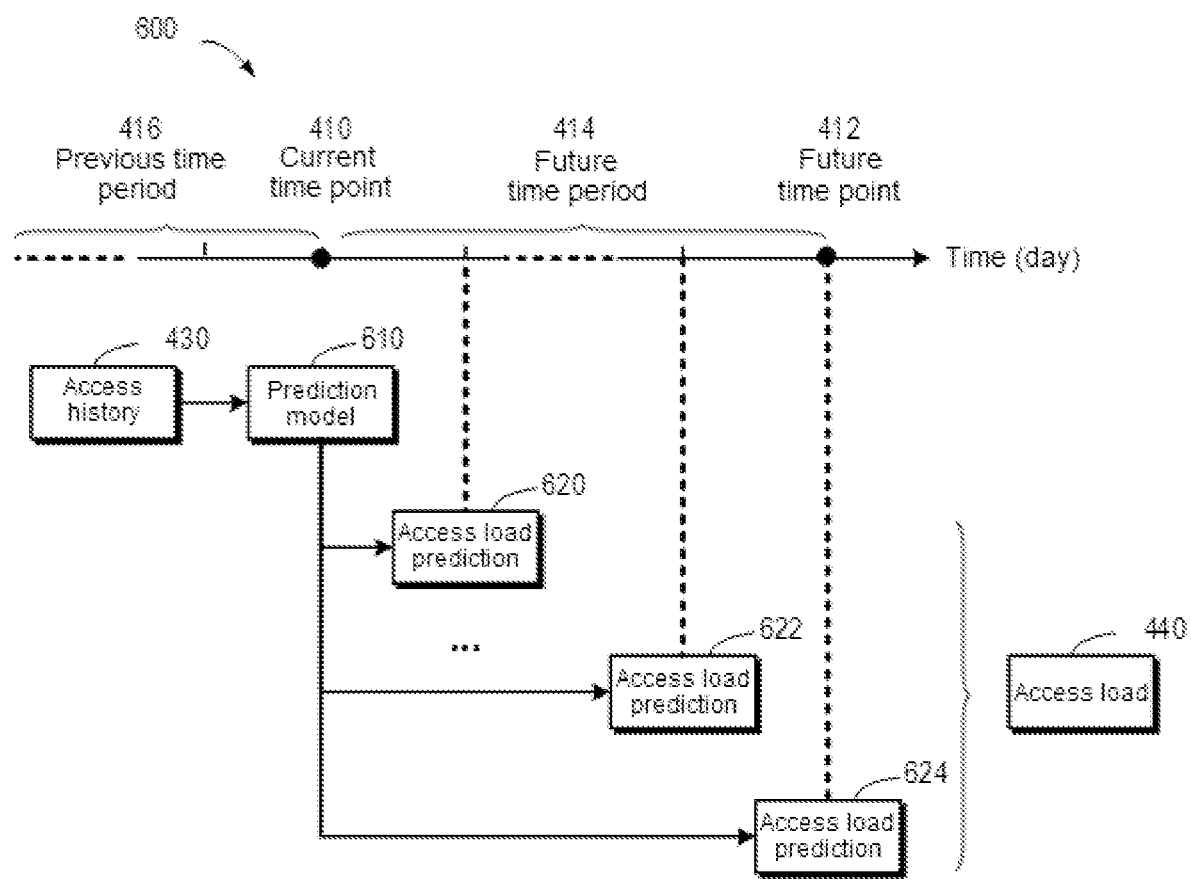
FIG. 6 schematically shows a block diagram of a process for determining an access load of a storage device in a future time period according to an implementation of the present disclosure.

According to an example implementation of the present disclosure, in order to determine an access load of a storage device in a future time period, a plurality of access load predictions of the storage device at a plurality of time points in future time period 414 may be acquired respectively, and an access load of the storage device may be determined based on the plurality of access load predictions. It will be understood that the operations for all storage devices are similar. Only one storage device will be used as an example below to describe the process of determining the access load. FIG. 6 schematically shows a block diagram of process 600 for determining an access load of a storage device in a future time period according to an implementation of the present disclosure. As shown in FIG. 4, prediction model 610 may be acquired based on a machine learning technology. Prediction model 610 herein may describe an association relationship between access histories and access loads of storage devices in the storage system.

According to an example implementation of the present disclosure, prediction model 610 may be obtained based on various machine learning technologies that have been developed at present and/or are to be developed in the future. When access history 430 is input to prediction model 610, the access load prediction at each time point in future time period 414 may be obtained respectively. As shown in FIG. 6, assuming that the length of future time period 414 is 5 days, access history 430 may be input to prediction model 610 to obtain access load prediction 620 on the 1st day in the future, . . . , access load prediction 622 on the 4th day in the future, and access load prediction 624 on the 5th day in the future.

It will be understood that prediction model 610 herein may have different granularities. According to an example implementation of the present disclosure, prediction model 610 may predict the access load of each extent in the storage device. Future time period 414 may include a plurality of time points, and thus the predicted values of the access loads at the plurality of time points may be summed to obtain an extent access load of an extent in future time period 414. Specifically, an extent access load of an ith extent in the storage device may be determined based on the following Formula 1:

$$SumPredT_{DE\ i} = \sum_{k=1}^{K} PredT_{DE\ i,t_k} = \sum_{k=1}^{K} TrendFunc(DE\ i, t_k) \quad \text{Formula 1}$$

where $SumPredT_{DE\ i}$ represents the extent access load of the ith extent in the storage device in future time period 414, K represents the number of time points included in future time period 414 (e.g., 5 in the above example), $PredT_{DE\ i,t_k}$ represents a predicted value of an access load of the ith extent at a kth time point in the future, and TrendFunc represents a prediction function in a prediction model. In other words, predicted values of the access loads of the ith extent at K time points may be acquired respectively based on the prediction function TrendFunc. Further, by summing the K predicted values, the extent access load of the ith extent in future time period 414 may be obtained.

Further, in order to obtain the access load of the storage device in future time period 414, the extent access loads of all the extents in the storage device may be summed to obtain the access load of the entire storage device. Specifically, an access load of the jth storage device among the plurality of storage devices may be determined based on the following Formula 2:

$$SumPredT_{disk\ j} = \sum_{k=1}^{K} PredT_{disk\ j,t_k} \quad \text{Formula 2}$$
$$= \sum_{k=1}^{K} \sum_{DEi \in disk\ j} PredT_{DEi,t_k}$$
$$= \sum_{k=1}^{K} \sum_{DEi \in disk\ j} TrendFunc(DE\ i, t_k)$$

where $SumPredT_{disk\ j}$ represents the access load of the jth storage device in future time period 414, and the meanings of other symbols are the same as in Formula 1. In other words, predicted values of the access loads of each extent in the jth storage device at K time points may be acquired respectively based on the prediction function TrendFunc. Further, for the ith extent among the plurality of extents, by summing the K predicted values, the extent access load of the ith extent in future time period 414 may be obtained. Then, by summing the extent access loads of all the extents, the access load of the jth storage device in future time period 414 may be obtained.

In the case where the access loads of the plurality of storage devices have been determined respectively, the access balance degree of the storage system may be determined based on the access loads of the plurality of storage devices. Hereinafter, more information about determining the access balance degree will be described by returning to FIG. 5. At block 530 in FIG. 5, an access balance degree of the storage system at a future time point is acquired based on the plurality of access loads. Assuming that the storage system includes M storage devices, the access balance degree of the storage system may be determined based on the following Formula 3.

$$\mu = \frac{\sqrt{\sum_{i=0}^{M-1} (T_{Disk\ i} - T_{Disk\ average})^2}{M-1}}}{T_{Disk\ average}}$$ Formula 3 where $\mu$ represents the access balance degree of the storage system, M represents the number of the storage devices in the storage system, $T_{Disk\ i}$ represents the access load of the ith storage device in future time period 414 determined based on the access histories described above, and $T_{Disk\ average}$ represents the average value of the access loads of the storage devices. With the example implementation of the present disclosure, based on the access load at each time point in future time period 414, the overall access balance degree of the storage system in future time period 414 may be determined in a more accurate and reliable manner. In this way, it may be ensured that the access loads of the storage system are maintained in a balanced state until the next load balancing process. It will be understood that Formula 3 above merely schematically shows an example for determining an access balance degree, which may be calculated based on other formulas according to an example implementation of the present disclosure.

At block 540, load balancing is performed among the plurality of storage devices in response to determining that the access balance degree satisfies a first predetermined condition. According to an example implementation of the present disclosure, this predetermined condition may be set based on a predetermined threshold. The larger the value of the access balance degree determined based on Formula 3, the more uneven the access loads of the plurality of storage devices; and the smaller the value of the access balance degree determined based on Formula 3, the more even the access loads of the plurality of storage devices.

According to an example implementation of the present disclosure, a predetermined threshold of 15% (or other values) may be specified. If the access balance degree determined based on Formula 3 is higher than this threshold, it means that according to a prediction-based access load change trend, the access balance degree of the storage system will be unbalanced before the next load balancing time point, and therefore, the load balancing process should be performed immediately. If the access balance degree determined based on Formula 3 is lower than this threshold, it means that according to the prediction-based access load change trend, the balance degree of the storage system may remain at an acceptable level before the next load balancing time point, and therefore, the load balancing process may not be performed at the current time point. With the example implementation of the present disclosure, it is possible to determine, in a more accurate and effective manner, whether to perform load balancing.

After it has been determined that the load balancing process needs to be performed, a source storage device and a destination storage device may be selected from the plurality of storage devices based on load balance indexes of storage devices in the plurality of storage devices. Specifically, a storage device with a relatively poor or the worst load balance index may be selected as the source storage device, and a storage device with a relatively good or the best load balance index may be selected as the destination storage device. Hereinafter, how to determine the load balance index of a storage device is first described. A plurality of load balance indexes of the plurality of storage devices may be determined respectively based on access load predictions of the plurality of storage devices at a plurality of time points. Specifically, the load balance index of the jth storage device may be determined based on the following Formula 4:

$$C_{Disk\ j1} = \frac{SumPredT_{Disk\ j}}{\sum_{k=0}^{M-12} SumPredT_{Disk\ k}}$$ Formula 4 where $C_{Disk\ j1}$ represents the load balance index of the jth storage device, the numerator $SumPredT_{Disk\ j}$ represents the access load of the jth storage device in future time period 414, and the denominator represents the summation of the access loads of all storage devices (i.e., storage devices 0 to M-1) in future time period 414. $C_{Disk\ j}$ The load level of each storage device in future time period 414 may be represented in a normalized manner. In this manner, it may be convenient to select the storage device with the highest (or relatively high) load from the plurality of storage devices as the source storage device and the storage device with the lowest (or relatively low) load as the destination storage device.

The foregoing has described determining the load balance indexes of the storage devices based on the access loads of the storage devices in future time period 414. According to an example implementation of the present disclosure, the load balance indexes of the storage devices may be further determined based on more factors. For example, a plurality of load balance indexes may be updated based on a plurality of device correlations of the plurality of storage devices. Here, the device correlation represents a distribution of a set of stripes involved by the storage system between a storage device and other storage devices than the storage device.

For convenience of description, hereinafter, more details of the example implementation of the present disclosure will be described using only a 4D+1P RAID stripe as an example of the stripe. The 4D+1P RAID stripe includes 5 extents, and data in the 5 extents are usually accessed in association. This results in increases in access loads of 5 storage devices respectively including each of the 5 extents. In summary, for any two storage devices, the more stripes the two storage devices serve together, the greater the possibility that the two storage devices are accessed simultaneously, and the higher the access loads of the two storage devices. Therefore, two storage devices should be prevented from serving too many stripes at the same time.

According to an example implementation of the present disclosure, the device correlation of a storage device may be first determined. In the context of the present disclosure, M is used to represent the number of storage devices in the storage system, and N is used to represent the width of a stripe. Assuming that the storage system includes 8 storage devices 210 to 217, then M=8 at this moment. When a 4D+1P RAID is adopted, N=4+1=5. For the ith storage device and the jth storage device (i≠j) in the plurality of storage devices, a correlation between the two storage devices can be expressed as $\gamma_{Disk\ i,Disk\ j}$. According to an example implementation of the present disclosure, the correlation of a storage device with respect to itself can be set to 0, that is, $\gamma_{Disk\ i,Disk\ i}=0$. Hereinafter, how to determine the correlation $\gamma_{Disk\ i,Disk\ j}$ between the ith storage device and the jth storage device will be described with reference to FIG. 7.

Figure 7:
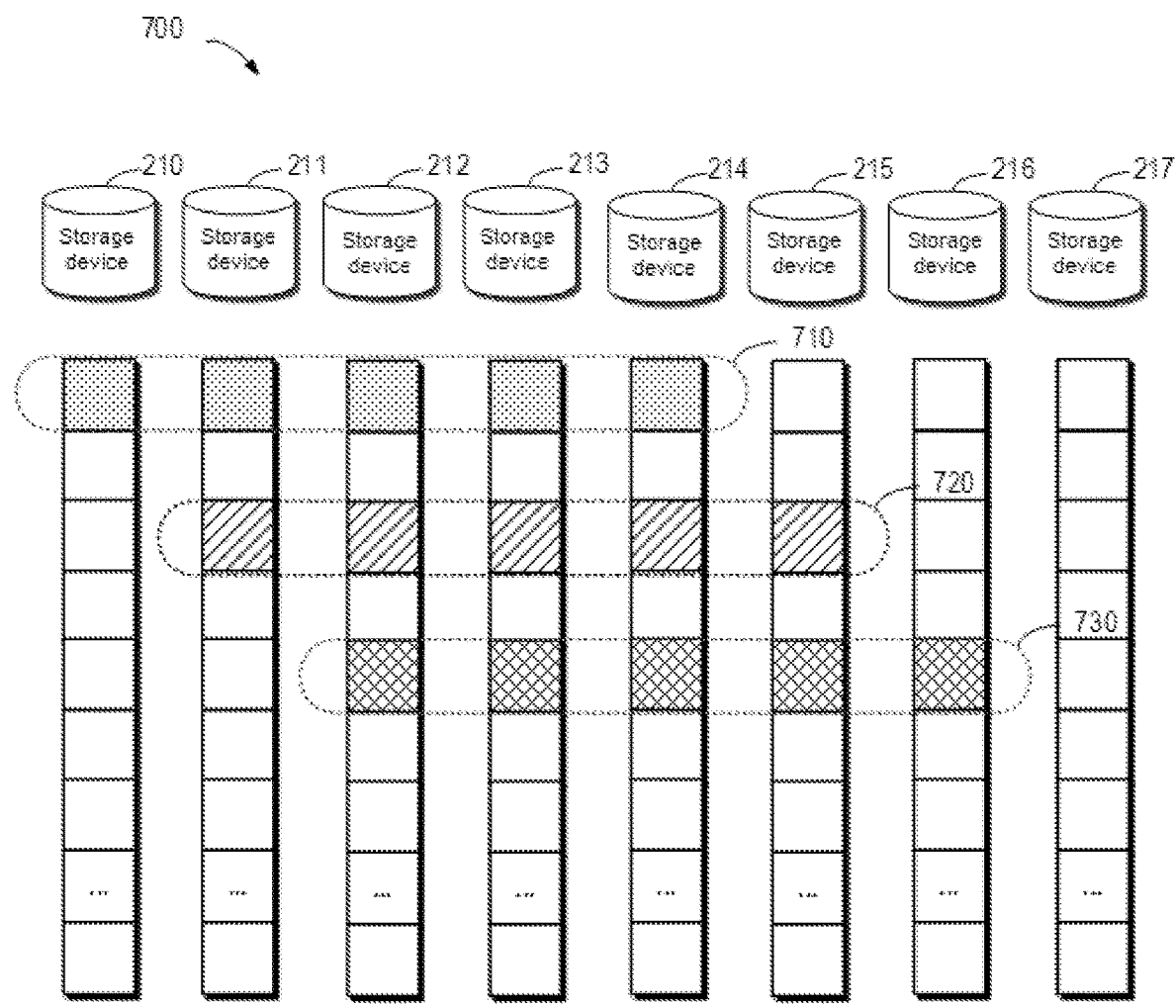
FIG. 7 schematically shows a block diagram of a process of determining a correlation between two storage devices according to an implementation of the present disclosure.

FIG. 7 schematically shows a block diagram of process 700 of determining a correlation between two storage devices according to an implementation of the present disclosure. As shown in FIG. 7, 3 stripes 710, 720, and 730 have been created in the storage system, and the correlation $\gamma_{Disk\ i,Disk\ j}$ may be determined based on the number of stripes that jointly involve the ith storage device and the jth storage device. If it is expected to determine a correlation between storage device 210 and storage device 211 (i.e., i=0, j=1), it may be found that only stripe 710 uses extents in storage device 210 and storage device 211 at the same time, and thus $\gamma_{Disk\ 0,Disk\ 1}=1$.

For another example, if it is expected to determine a correlation between storage device 211 and storage device 212 (i.e., i=1, j=2), it may be found that stripe 710 uses extents in storage device 210 and storage device 211 at the same time, stripe 720 also uses extents in storage device 210 and storage device 211 at the same time, and thus $\gamma_{Disk\ 1,Disk\ 2}=2$. Similarly, a correlation between any two storage devices in the plurality of storage devices may be determined. It will be understood that a mapping relationship between stripes and extents in the stripes may be conveniently obtained from address mapping 330 of the storage system. Thus, with the example implementation of the present disclosure, a correlation between any two storage devices may be determined in a simple and effective manner.

According to an example implementation of the present disclosure, a device correlation of a specific storage device in the plurality of storage devices may be determined based on a correlation between two storage devices. Specifically, a correlation between the specific storage device and each of other storage devices than the specific storage device may be determined respectively. Furthermore, the device correlation of the specific storage device may be determined based on the determined multiple correlations.

According to an example implementation of the present disclosure, the device correlation may be set to be directly proportional to the correlations between the storage device and each of other storage devices. For example, for the acquired multiple correlations, the device correlation may be determined based on a summation operation. With the example implementation of the present disclosure, the device correlation of the specific storage device may be determined based on the summation of the correlations between the specific storage device and other storage devices and on the basis of simple mathematical operations.

Assuming that it is expected to determine a device correlation of the jth storage device, a correlation between the jth storage device and another ith storage device (0≤i≤M−1, and i≠j) may be determined based on the method described above with reference to FIG. 7. According to an example implementation of the present disclosure, the device correlation $\gamma_{Disk\ j}$ of the jth storage device may be determined based on the following Formula 5:

$$\gamma_{Disk\ j} = \sum_{j=0}^{M-1} \gamma_{Disk\ j,Disk\ i} \qquad \text{Formula 5}$$

where $\gamma_{Disk\ j}$ represents the device correlation of the jth storage device, $\gamma_{Disk\ j,Disk\ i}$ represents the correlation between the jth storage device and another ith storage device, and M represents the number of storage devices in the resource pool. It will be understood that Formula 5 above only schematically shows a specific example for determining a device correlation. According to an example implementation of the present disclosure, other formulas may also be used to determine the device correlation. For example, the device correlation may be determined based on a product of a plurality of correlations.

According to an example implementation of the present disclosure, device correlations of the plurality of storage devices may be determined respectively based on Formula 5 described above, and the load balance indexes of the storage devices may be determined based on the device correlations of the storage devices. By taking into account the device correlation, the load balance index of a storage device may be determined based on the following Formula 6:

$$C_{Disk\ j} = \omega_T \cdot \frac{SumPredT_{Disk\ j}}{\sum_{k=0}^{M-1} SumPredT_{Disk\ k}} + \omega_\gamma \cdot \frac{\gamma_{Disk\ j}}{\sum_{k=0}^{M-1} \gamma_{Disk\ k}} \qquad \text{Formula 6}$$

where $C_{Disk\ j1}$ represents the load balance index of the jth storage device, $$\frac{SumPredT_{Disk\ j}}{\sum_{k=0}^{M-1} SumPredT_{Disk\ k}}$$

has the same meaning as that in Formula 4, $\gamma_{Disk\ j}$ represents the device correlation of the jth storage device, $\Sigma_{k=0}^{M-1}\gamma_{Disk\ k}$ represents the summation of the device correlations of a plurality of storage devices (i.e., storage devices 0 to M−1), and $\omega_T$ and $\omega_\gamma$ respectively represent weights for the access load and the device correlation. It will be understood that Formula 6 above is only a schematic way to determine the load balance index. According to an example implementation of the present disclosure, the load balance index may be determined based on other formulas. For example, the load balance index may be determined based on a product of the device correlation and the access load.

According to an example implementation of the present disclosure, value ranges of $\omega_T$ and $\omega_\gamma$ may be set. It will be understood that the purpose of the present disclosure is to trigger the load balancing process based on the imbalance of access loads, so that the value range of $\omega_T$ may be set to a relatively high value (e.g., 0.6-0.9), and the value range of $\omega_\gamma$ may be set to a relatively low value (e.g., 0.1-0.4).

How to determine the load balance index of each storage device has been described above, and how to select source and destination storage devices based on the load balance index will be described below. It will be understood that the larger the value of $C_{Disk\ i}$, the more the workload of the ith storage device deviates from the average value. According to an example implementation of the present disclosure, a storage device with a high load balance index may first be selected as the source storage device, and a storage device with a low load balance index may be selected as the destination storage device.

According to an example implementation of the present disclosure, a storage device with the highest or relatively high load balance index may be selected as the source storage device from the plurality of storage devices based on Formula 4 or 6 above. In this way, a storage device with a poor balance degree may be found preferentially, and extents in this storage device may be preferentially moved to other storage devices to reduce the workload of the storage device. According to an example implementation of the present disclosure, the load balance indexes of all the storage devices may be compared, and a storage device with the highest load balance index may be selected as the source storage device. In this way, a storage device with the worst balance degree may be quickly found in a convenient and effective manner.

Further, a source extent may be selected from a set of extents in the source storage device that have been allocated. It will be understood that, at this moment, the source storage device is the storage device with the worst load balance index in the plurality of storage devices, and moving any extent in the source storage device to other storage devices will improve the load balance index of the source storage device. According to an example implementation of the present disclosure, in order to achieve balance more quickly, based on access load predictions of a plurality of extents in the source storage device at a plurality of time points, a plurality of extent access loads of the plurality of extents may be determined respectively. Further, a source extent may be selected from the plurality of extents in the source storage device based on the plurality of extent access loads, and data in the extent may be moved to other storage devices.

Specifically, the extent access load of each extent in the source storage device may be determined based on Formula 1 described above. An extent with the largest or a relatively large extent access load may be selected as the source extent. In this way, extents that contribute the most to the imbalance degree of the source storage device may be preferentially migrated to the destination storage device with a relatively low load.

The foregoing has described selecting the storage device with the lowest or a relatively low load balance index as the destination storage device. According to an example implementation of the present disclosure, the destination storage device may be selected based on the plurality of load balance indexes and a stripe correlation between a stripe where the source extent is located and a storage device in the plurality of storage devices. Herein, stripe correlation describes a correlation between one storage device and a plurality of storage devices where one stripe is located. The higher the stripe correlation, the closer the relationship between the storage device and the stripe. For example, a stripe correlation $\gamma_{Disk\ j,RE\ e}$ between the jth storage device and the eth stripe may be determined based on the following Formula 7.

$$\gamma_{Disk\ j,RE\ e} = \sum_{Disk\ i \in RE\ e} \gamma_{Disk\ j, Disk\ i} \qquad \text{Formula 7}$$

where $\gamma_{Disk\ j,RE\ e}$ represents the stripe correlation between the jth storage device and the eth stripe, $\gamma_{Disk\ j, Disk\ i}$ represents the correlation between the jth storage device and the ith storage device, and the ith storage device represents various storage devices including extents in the eth stripe. Further, the destination storage device may be selected based on the following Formula 8.

$$C_{Disk\ j,RE\ e} = \omega_T \cdot \frac{SumPredT_{Disk\ j}}{\Sigma_{Disk\ j \notin RE\ e} SumPredT_{Disk\ j}} + \omega_\gamma \cdot \frac{\gamma_{Disk\ j} + \gamma_{Disk\ j,RE\ e}}{\Sigma_{Disk\ j \notin RE\ e}(\gamma_{Disk\ j} + \gamma_{Disk\ j,RE\ e})} \qquad \text{Formula 8}$$

where $C_{Disk\ j,RE\ e}$ represents the score of taking the jth storage device as the destination storage device (i.e., selecting the last extent in the eth stripe from the jth storage device), and at this moment, the eth stripe is the stripe where the source extent was previously located (at this moment, the stripe does not include the source extent). The meanings of various symbols in Formula 8 are the same as those described above, and will not be described in detail herein. The first item $$\omega_T \cdot \frac{SumPredT_{Disk\ j}}{\Sigma_{Disk\ j \notin RE\ e} SumPredT_{Disk\ j}}$$

in Formula 8 represents the impact of the access load of the storage device in future time period 414 on the score. The second term $$\omega_\gamma \cdot \frac{\gamma_{Disk\ j} + \gamma_{Disk\ j,RE\ e}}{\Sigma_{Disk\ j \notin RE\ e}(\gamma_{Disk\ j} + \gamma_{Disk\ j,RE\ e})}$$

in Formula 8 represents the impacts of the device correlation and the stripe correlation on the score. A storage device with the lowest score may be selected as the destination storage device based on Formula 8.

After the source extent and the destination storage device have been determined, data in the source extent may be moved to an idle extent in the destination storage device. It will be understood that since moving the data will change the distribution of stripes in the storage system, it is necessary to determine the load balance index prediction of the destination storage device after the source extent has been moved to the idle extent in the destination storage device. If the load balance index of the source storage device is higher than the load balance index prediction, the data in the source extent is moved to the idle extent in the destination storage device. Here, the load balance index of the source storage device is higher than the load balance index prediction of the destination storage device, which means that moving the data can improve the load balance index of the storage device, so data in the source extent can be moved to the idle extent in the destination storage device. Otherwise, it means that moving the data will cause a more serious imbalance, so the operation of moving data will not be performed.

Figure 8:
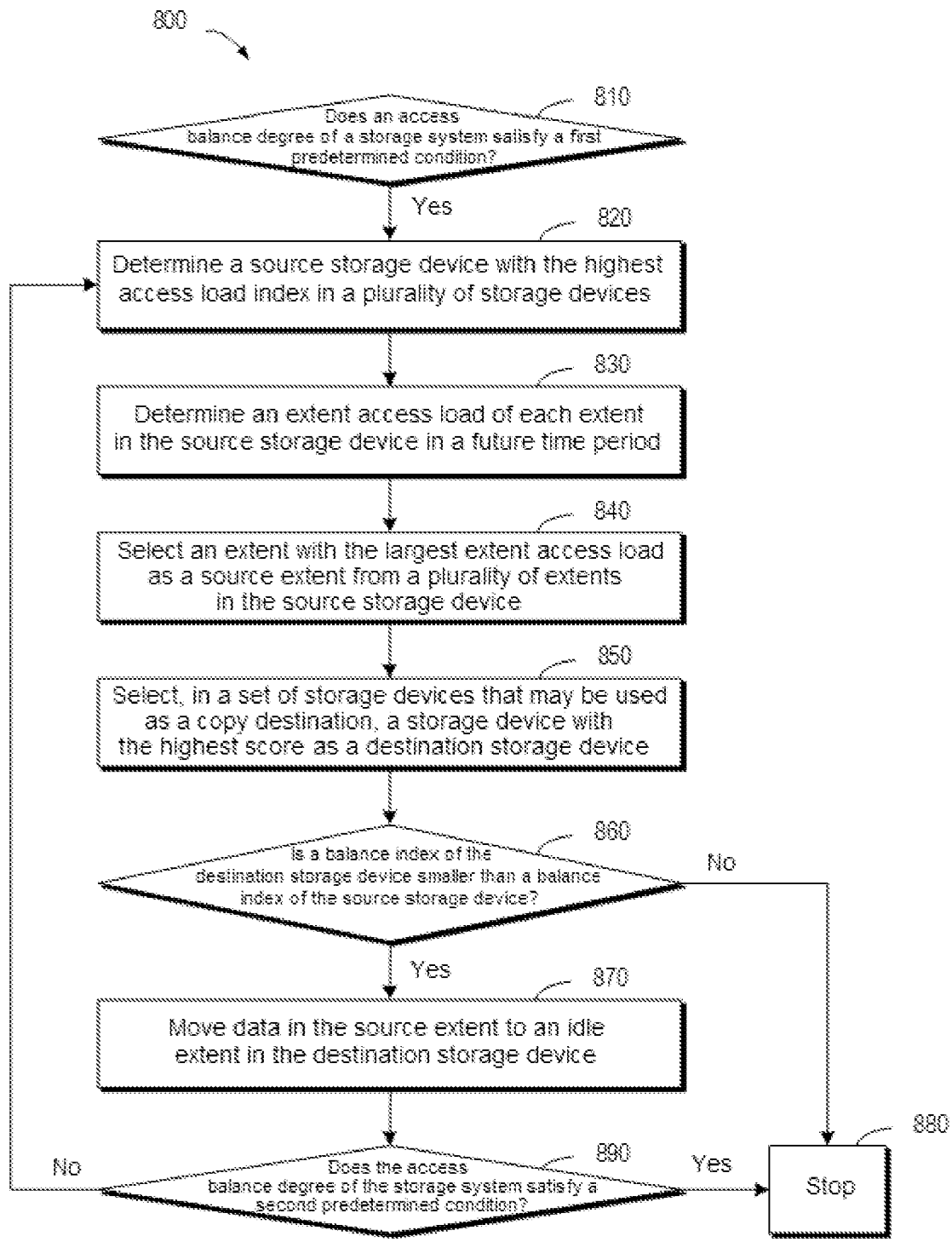
FIG. 8 schematically shows a flow chart of a method for performing load balancing according to an implementation of the present disclosure.

Hereinafter, a method for performing re-balancing according to an example implementation of the present disclosure will be described in detail. FIG. 8 schematically shows a flow chart of method 800 for performing load balancing according to an implementation of the present disclosure. At block 810, it may be determined whether an access balance degree of a storage system satisfies a first predetermined condition. If the condition is satisfied, method 800 proceeds to block 820. At block 820, a storage device (i.e., a source storage device) with the highest access load index in a plurality of storage devices may be determined. An access load of each storage device may be determined based on Formula 4 or 6 described above, and the storage device with the largest access load may be used as the source storage device.

At block 830, an extent access load of each extent in the source storage device in a future time period may be determined. At block 840, an extent with the largest extent access load may be selected as a source extent. At block 850, in a set of storage devices that can be used as a copy destination, a storage device with the highest score is selected as a destination storage device. At block 860, an access load index of the destination storage device after copying may be determined and compared with the access load index of the source storage device. If the access load index of the destination storage device is smaller than the access load index of the source storage device, method 800 proceeds to block 870 to move data in the source extent to an idle extent in the destination storage device. Otherwise, method 800 proceeds to block 880 to stop the load balancing operation.

According to an example implementation of the present disclosure, the moving operation may be performed in a plurality of rounds. After each movement operation, an access balance degree of the storage system after moving the data in the source extent to the idle extent in the destination storage device may be determined (e.g., it may be determined based on Formula 3 described above). At block 890, if the access balance degree satisfies a second predetermined condition, the method proceeds to block 880 to stop the load balancing operation. Otherwise, method 800 may return to block 820 and perform the next round of operations, and when the result of determination at block 860 is NO or the result of determination at block 890 is YES, method 800 proceeds to block 880 and stops. With the example implementation of the present disclosure, the load balancing process may be performed in a plurality of rounds. In this way, it may be ensured that the load balance index of the storage system will remain in a good state for a long time period in the future, and that the load balancing process will not be performed frequently.

Examples of the method according to the present disclosure have been described in detail above with reference to FIGS. 2 to 8, and implementations of a corresponding apparatus will be described below. According to an example implementation of the present disclosure, an apparatus for managing an access load of a storage system is provided. The apparatus includes: a receiving module configured to receive, for a plurality of storage devices in the storage system, a plurality of access histories of the plurality of storage devices in a previous time period respectively; a determination module configured to determine a plurality of access loads of the plurality of storage devices in a future time period respectively based on the plurality of access histories of the plurality of storage devices, the future time period being between a current time point and a future time point for performing future load balancing; an acquisition module configured to acquire an access balance degree of the storage system at the future time point based on the plurality of access loads; and a balance module configured to perform load balancing among the plurality of storage devices in response to determining that the access balance degree satisfies a first predetermined condition. According to an example implementation of the present disclosure, the apparatus further includes modules for executing other steps of methods 500 and 800 described above.

Figure 9:
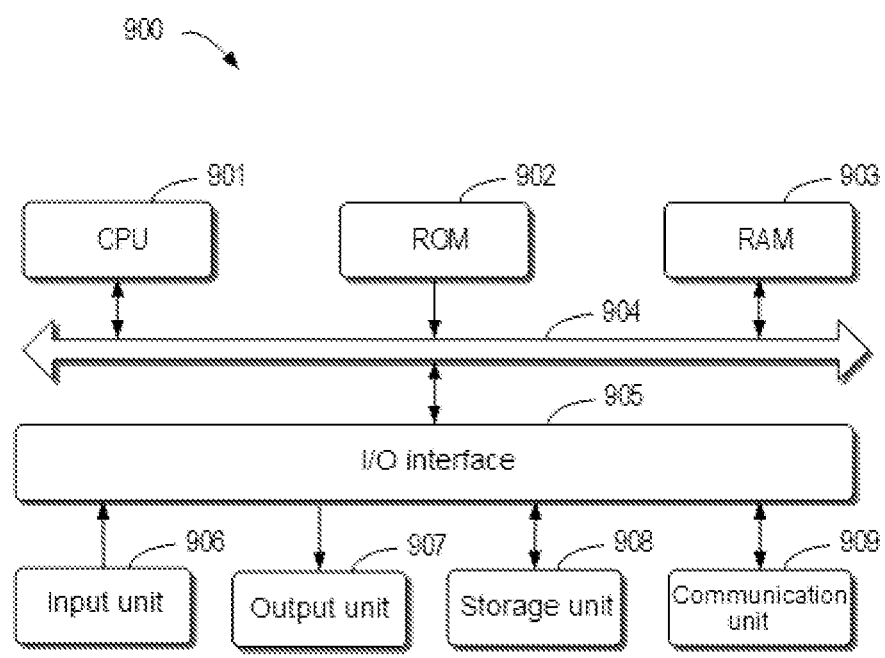
FIG. 9 schematically shows a block diagram of a device for managing an access load of a storage system according to an example implementation of the present disclosure.

FIG. 9 schematically shows a block diagram of device 900 for managing load balance of a storage system according to an example implementation of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, for example, methods 500 and 800, may be performed by processing unit 901. For example, in some implementations, methods 500 and 800 may be implemented as a computer software program that is tangibly contained in a machine-readable medium, such as storage unit 908. In some implementations, part or all of the computer program may be loaded in and/or installed to device 900 through ROM 902 and/or communication unit 909. When the computer program is loaded to RAM 903 and executed by CPU 901, one or more steps of methods 500 and 800 described above may be executed. Alternatively, in other implementations, CPU 901 may also be configured in any other suitable manner to implement the above processes/methods.

According to an example implementation of the present disclosure, an electronic device is provided. The electronic device includes: at least one processor; and a memory coupled to the at least one processor, wherein the memory has instructions stored therein which, when executed by the at least one processor, cause the device to perform actions for managing an access load of a storage system. The actions include: receiving, for a plurality of storage devices in the storage system, a plurality of access histories of the plurality of storage devices in a previous time period respectively; determining a plurality of access loads of the plurality of storage devices in a future time period respectively based on the plurality of access histories of the plurality of storage devices, the future time period being between a current time point and a future time point for performing future load balancing; acquiring an access balance degree of the storage system at the future time point based on the plurality of access loads; and performing load balancing among the plurality of storage devices in response to determining that the access balance degree satisfies a first predetermined condition.

According to an example implementation of the present disclosure, determining the plurality of access loads of the plurality of storage devices in the future time period respectively includes: for a storage device in the plurality of storage devices, acquiring a plurality of access load predictions of the storage device at a plurality of time points in the future time period respectively; and determining an access load of the storage device based on the plurality of access load predictions.

According to an example implementation of the present disclosure, acquiring the plurality of access load predictions respectively includes: acquiring a prediction model describing an association relationship between access histories and access loads of storage devices in the storage system; and determining, for a time point in the plurality of time points, an access load prediction of the storage device at the time point using the prediction model and an access history of the storage device in the previous time period.

According to an example implementation of the present disclosure, data in the storage system is stored in a set of stripes, stripes in the set of stripes including a plurality of extents from at least part of the plurality of storage devices, and performing the load balancing includes: selecting a source storage device and a destination storage device from the plurality of storage devices respectively; and moving data in the source storage device to an idle extent in the destination storage device.

According to an example implementation of the present disclosure, selecting the source storage device and the destination storage device includes: determining a plurality of load balance indexes of the plurality of storage devices respectively based on access load predictions of the plurality of storage devices at the plurality of time points; and selecting the source storage device and the destination storage device from the plurality of storage devices based on the plurality of load balance indexes.

According to an example implementation of the present disclosure, selecting the source storage device based on the plurality of load balance indexes further includes: selecting the source storage device based on the plurality of load balance indexes and a plurality of device correlations of the plurality of storage devices, the device correlation representing a distribution of the set of stripes involved by the storage system between the storage device and other storage devices than the storage device.

According to an example implementation of the present disclosure, moving the data in the source storage device to the idle extent in the destination storage device further includes: determining, based on access load predictions of a plurality of extents in the source storage device at the plurality of time points, a plurality of extent access loads of the plurality of extents respectively; selecting a source extent from the plurality of extents based on the plurality of extent access loads; and moving data in the source extent to the idle extent.

According to an example implementation of the present disclosure, selecting the destination storage device further includes: selecting the destination storage device based on the plurality of load balance indexes and a stripe correlation between a stripe where the source extent is located and a storage device in the plurality of storage devices.

According to an example implementation of the present disclosure, the actions further include: determining a load balance index of the destination storage device after data in the source extent is moved to the idle extent in the destination storage device; and moving the data in the source extent to the idle extent in the destination storage device according to determining that the load balance index of the source storage device is higher than the load balance index of the destination storage device.

According to an example implementation of the present disclosure, the actions further include: determining an access balance degree of the storage system after data in the source extent is moved to the idle extent in the destination storage device; and stopping the load balancing according to determining that the access balance degree satisfies a second predetermined condition.

According to an example embodiment of the present disclosure, a computer program product is provided. The computer program product is tangibly stored on a non-transitory computer-readable medium and includes machine-executable instructions that are used to implement the method according to the present disclosure.

According to an example embodiment of the present disclosure, a computer-readable medium is provided. The computer-readable medium stores machine-executable instructions. When executed by at least one processor, the machine-executable instructions cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block in the flow charts and/or block diagrams as well as a combination of blocks in the flow charts and/or block diagrams may be implemented using computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flow charts and/or block diagrams.

The flow charts and block diagrams in the drawings show the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various implementations of the present disclosure have been described above. The above description is illustrative and not exhaustive, and is not limited to the various implementations disclosed. Many modifications and variations will be apparent to persons of ordinary skill in the art without departing from the scope and spirit of the illustrated various implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing an access load of a storage system, comprising:
   receiving, for a plurality of storage devices in the storage system, a plurality of access histories of the plurality of storage devices in a previous time period respectively;
   determining a plurality of access loads of the plurality of storage devices in a future time period respectively based on the plurality of access histories of the plurality of storage devices, the future time period being between a current time point and a future time point for performing future load balancing;
   acquiring an access balance degree of the storage system at the future time point based on the plurality of access loads; and
   performing load balancing among the plurality of storage devices in response to determining that the access balance degree satisfies a first predetermined condition;
   wherein data in the storage system is stored in a set of stripes, stripes in the set of stripes comprising a plurality of extents from at least part of the plurality of storage devices, and performing the load balancing comprises:
   selecting a source storage device and a destination storage device from the plurality of storage devices respectively; and
   moving data in the source storage device to an idle extent in the destination storage device.

2. The method according to claim 1, wherein determining the plurality of access loads of the plurality of storage devices in the future time period respectively comprises: for a storage device in the plurality of storage devices, acquiring a plurality of access load predictions of the storage device at a plurality of time points in the future time period respectively; and determining an access load of the storage device based on the plurality of access load predictions.

3. The method according to claim 2, wherein acquiring the plurality of access load predictions respectively comprises:

acquiring a prediction model describing an association relationship between access histories and access loads of storage devices in the storage system; and determining, for a time point in the plurality of time points, an access load prediction of the storage device at the time point using the prediction model and an access history of the storage device in the previous time period.

4. The method according to claim 3, wherein selecting the source storage device and the destination storage device comprises:

determining a plurality of load balance indexes of the plurality of storage devices respectively based on access load predictions of the plurality of storage devices at the plurality of time points; and selecting the source storage device and the destination storage device from the plurality of storage devices based on the plurality of load balance indexes.

5. The method according to claim 4, wherein selecting the source storage device based on the plurality of load balance indexes further comprises:

selecting the source storage device based on the plurality of selecting the source storage device based on the plurality of load balance indexes and a plurality of device correlations of the plurality of storage devices, the device correlation representing a distribution of the set of stripes involved by the storage system between the storage device and other storage devices than the storage device.

6. The method according to claim 4, wherein moving the data in the source storage device to the idle extent in the destination storage device further comprises:

determining, based on access load predictions of a plurality of source extents in the source storage device at the plurality of time points, a plurality of extent access loads of the plurality of source extents respectively;

selecting a source extent from the plurality of source extents based on the plurality of extent access loads; and moving data in the source extent to the idle extent.

7. The method according to claim 6, wherein selecting the destination storage device further comprises:

selecting the destination storage device based on the plurality of load balance indexes and a stripe correlation between a stripe where the source extent is located and a storage device in the plurality of storage devices.

8. The method according to claim 1, further comprising:

determining a load balance index of the destination storage device after data in the source extent is moved to the idle extent in the destination storage device; and moving the data in the source extent to the idle extent in the destination storage device according to determining that the load balance index of the source storage device is higher than the load balance index of the destination storage device.

9. The method according to claim 8, further comprising:

determining an updated access balance degree of the storage system after data in the source extent is moved to the idle extent in the destination storage device; and stopping the load balancing according to determining that the updated access balance degree satisfies a second predetermined condition.

10. An electronic device, comprising:

at least one processor; and a memory coupled to the at least one processor, wherein the memory has instructions stored therein that, when executed by the at least one processor, cause the device to perform actions for managing an access load of a storage system, the actions comprising:

receiving, for a plurality of storage devices in the storage system, a plurality of access histories of the plurality of storage devices in a previous time period respectively;

determining a plurality of access loads of the plurality of storage devices in a future time period respectively based on the plurality of access histories of the plurality of storage devices, the future time period being between a current time point and a future time point for performing future load balancing;

acquiring an access balance degree of the storage system at the future time point based on the plurality of access loads; and performing load balancing among the plurality of storage devices in response to determining that the access balance degree satisfies a first predetermined condition;

wherein data in the storage system is stored in a set of stripes, stripes in the set of stripes comprising a plurality of extents from at least part of the plurality of storage devices, and performing the load balancing comprises:

selecting a source storage device and a destination storage device from the plurality of storage devices respectively; and moving data in the source storage device to an idle extent in the destination storage device.

11. The device according to claim 10, wherein determining the plurality of access loads of the plurality of storage devices in the future time period respectively comprises: for a storage device in the plurality of storage devices, acquiring a plurality of access load predictions of the storage device at a plurality of time points in the future time period respectively; and determining an access load of the storage device based on the plurality of access load predictions.

12. The device according to claim 11, wherein acquiring the plurality of access load predictions respectively comprises:

acquiring a prediction model describing an association relationship between access histories and access loads of storage devices in the storage system; and determining, for a time point in the plurality of time points, an access load prediction of the storage device at the time point using the prediction model and an access history of the storage device in the previous time period.

13. The device according to claim 12, wherein selecting the source storage device and the destination storage device comprises:

determining a plurality of load balance indexes of the plurality of storage devices respectively based on access load predictions of the plurality of storage devices at the plurality of time points; and selecting the source storage device and the destination storage device from the plurality of storage devices based on the plurality of load balance indexes.

14. The device according to claim 13, wherein selecting the source storage device based on the plurality of load balance indexes further comprises:
 selecting the source storage device based on the plurality of selecting the source storage device based on the plurality of load balance indexes and a plurality of device correlations of the plurality of storage devices, the device correlation representing a distribution of the set of stripes involved by the storage system between the storage device and other storage devices than the storage device.

15. The device according to claim 13, wherein moving the data in the source storage device to the idle extent in the destination storage device further comprises:
 determining, based on access load predictions of a plurality of source extents in the source storage device at the plurality of time points, a plurality of extent access loads of the plurality of source extents respectively;
 selecting a source extent from the plurality of source extents based on the plurality of extent access loads; and
 moving data in the source extent to the idle extent.

16. The device according to claim 15, wherein selecting the destination storage device further comprises:
 selecting the destination storage device based on the plurality of load balance indexes and a stripe correlation between a stripe where the source extent is located and a storage device in the plurality of storage devices.

17. The device according to claim 10, wherein the actions further comprise:
 determining a load balance index of the destination storage device after data in the source extent is moved to the idle extent in the destination storage device;
 moving the data in the source extent to the idle extent in the destination storage device according to determining that the load balance index of the source storage device is higher than the load balance index of the destination storage device;
 determining an updated access balance degree of the storage system after data in the source extent is moved to the idle extent in the destination storage device; and
 stopping the load balancing according to determining that the updated access balance degree satisfies a second predetermined condition.

18. A computer program product having a non-transitory computer readable medium which stores a set of instructions to manage an access load of a storage system; the set of instructions, when carried out by computerized circuitry, causing the computerized circuitry to perform a method of:
 receiving, for a plurality of storage devices in the storage system, a plurality of access histories of the plurality of storage devices in a previous time period respectively;
 determining a plurality of access loads of the plurality of storage devices in a future time period respectively based on the plurality of access histories of the plurality of storage devices, the future time period being between a current time point and a future time point for performing future load balancing;
 acquiring an access balance degree of the storage system at the future time point based on the plurality of access loads; and
 performing load balancing among the plurality of storage devices in response to determining that the access balance degree satisfies a first predetermined condition;
 wherein data in the storage system is stored in a set of stripes, stripes in the set of stripes comprising a plurality of extents from at least part of the plurality of storage devices, and performing the load balancing comprises:
 selecting a source storage device and a destination storage device from the plurality of storage devices respectively; and
 moving data in the source storage device to an idle extent in the destination storage device.

19. A method for managing an access load of a storage system, comprising:
 receiving, for a plurality of storage devices in the storage system, a plurality of access histories of the plurality of storage devices in a previous time period respectively;
 determining a plurality of access loads of the plurality of storage devices in a future time period respectively based on the plurality of access histories of the plurality of storage devices, the future time period being between a current time point and a future time point for performing future load balancing;
 acquiring an access balance degree of the storage system at the future time point based on the plurality of access loads;
 performing load balancing among the plurality of storage devices in response to determining that the access balance degree satisfies a first predetermined condition;
 determining a load balance index of a destination storage device after data in a source extent is moved to an idle extent in the destination storage device; and
 moving the data in the source extent to the idle extent in the destination storage device according to determining that a load balance index of a source storage device is higher than the load balance index of the destination storage device.

20. The method according to claim 19, further comprising:
 determining an updated access balance degree of the storage system after data in the source extent is moved to the idle extent in the destination storage device; and
 stopping the load balancing according to determining that the updated access balance degree satisfies a second predetermined condition.

* * * * *